US012603775B2

(12) United States Patent
Xiao et al.

(10) Patent No.: US 12,603,775 B2
(45) Date of Patent: Apr. 14, 2026

(54) DATA INTERACTION

(71) Applicant: MASHANG CONSUMER FINANCE CO., LTD., Chongqing (CN)

(72) Inventors: Wenquan Xiao, Chongqing (CN); Ling Tang, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 133 days.

(21) Appl. No.: 18/755,401

(22) Filed: Jun. 26, 2024

(65) Prior Publication Data

US 2025/0184135 A1      Jun. 5, 2025

(30) Foreign Application Priority Data

Dec. 1, 2023      (CN) .......................... 202311639612.0

(51) Int. Cl.
 *H04L 9/14*          (2006.01)
 *H04L 9/32*          (2006.01)
(52) U.S. Cl.
 CPC .............. *H04L 9/14* (2013.01); *H04L 9/3247* (2013.01)
(58) Field of Classification Search
 None
 See application file for complete search history.

(56) References Cited

U.S. PATENT DOCUMENTS

| | | | | |
|---|---|---|---|---|
| 2020/0112436 A1* | 4/2020 | Kanukollu | ............ | H04L 9/3073 |
| 2020/0186502 A1* | 6/2020 | Suresh | .................... | H04L 9/088 |
| 2023/0388280 A1* | 11/2023 | Suehr | .................... | H04L 9/3247 |

OTHER PUBLICATIONS

Cai, J., Tao, X. and Wang, C., 2023. Cooperative authentication scheme for heterogeneous networks based on identity group signature and blockchain. IEEE Transactions on Vehicular Technology, 73(1), pp. 1394-1399. (Year: 2023).*
Liu, H., Zhang, P., Pu, G., Yang, T., Maharjan, S. and Zhang, Y., 2020. Blockchain empowered cooperative authentication with data traceability in vehicular edge computing. IEEE Transactions on Vehicular Technology, 69(4), pp. 4221-4232. (Year: 2020).*

* cited by examiner

*Primary Examiner* — Luu T Pham
*Assistant Examiner* — Edward X Long
(74) *Attorney, Agent, or Firm* — PV IP PC; Wei Te Chung

(57)          ABSTRACT

A data interaction method is applied to a first member node of a first alliance network including an operation node and a plurality of member nodes. The method includes: encrypting first interaction data based on a public key of the second member node to obtain first encrypted data; signing the first interaction data and/or the first encrypted data based on a private key of the first member node to obtain first signed data; generating a first access token for a first node based on the first encrypted data and a first initial access token for the first node; generating a first request message for data interaction based on the first encrypted data, the first signed data and the first access token; and sending the first request message to the first node.

7 Claims, 6 Drawing Sheets

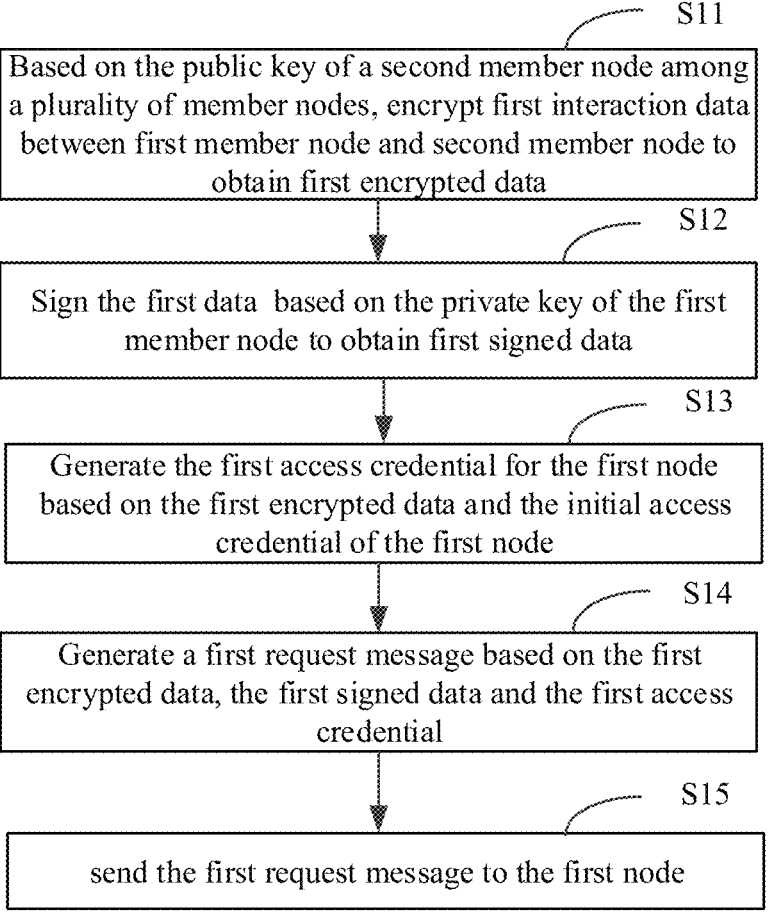

S11

Based on the public key of a second member node among a plurality of member nodes, encrypt first interaction data between first member node and second member node to obtain first encrypted data

S12

Sign the first data based on the private key of the first member node to obtain first signed data

S13

Generate the first access credential for the first node based on the first encrypted data and the initial access credential of the first node

S14

Generate a first request message based on the first encrypted data, the first signed data and the first access credential

S15 send the first request message to the first node

FIG. 1

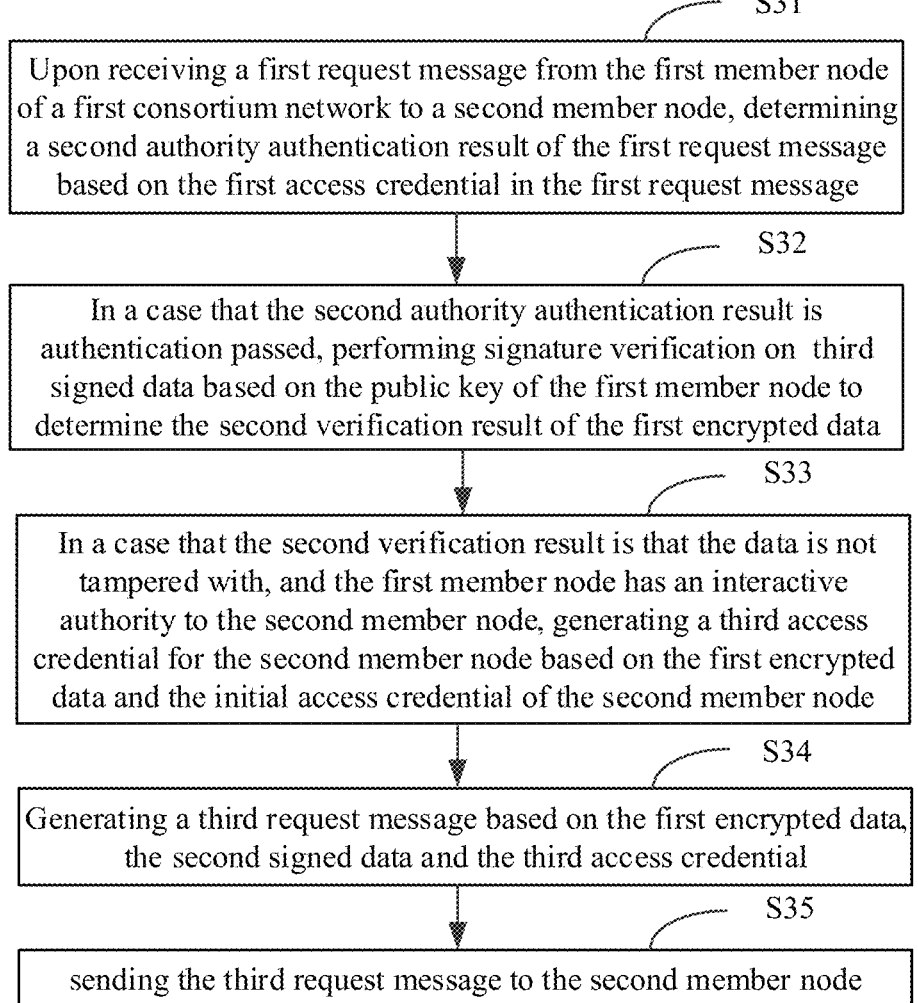

Upon receiving a first request message from the first member node of a first consortium network to a second member node, determining a second authority authentication result of the first request message based on the first access credential in the first request message

S31

In a case that the second authority authentication result is authentication passed, performing signature verification on third signed data based on the public key of the first member node to determine the second verification result of the first encrypted data

S32

In a case that the second verification result is that the data is not tampered with, and the first member node has an interactive authority to the second member node, generating a third access credential for the second member node based on the first encrypted data and the initial access credential of the second member node

S33

Generating a third request message based on the first encrypted data, the second signed data and the third access credential

S34 sending the third request message to the second member node

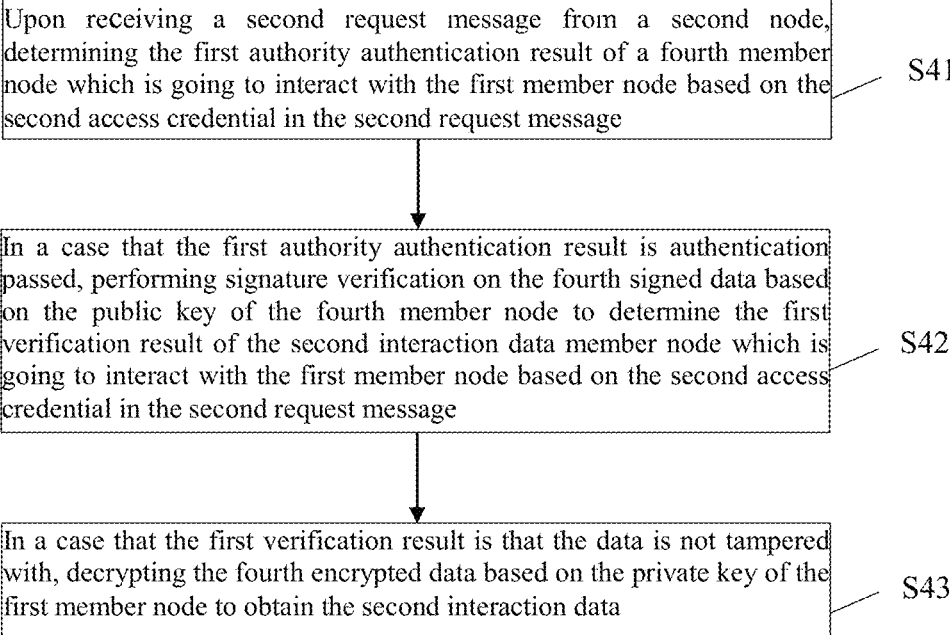

Upon receiving a second request message from a second node, determining the first authority authentication result of a fourth member node which is going to interact with the first member node based on the second access credential in the second request message — S41

In a case that the first authority authentication result is authentication passed, performing signature verification on the fourth signed data based on the public key of the fourth member node to determine the first verification result of the second interaction data member node which is going to interact with the first member node based on the second access credential in the second request message — S42

In a case that the first verification result is that the data is not tampered with, decrypting the fourth encrypted data based on the private key of the first member node to obtain the second interaction data — S43

FIG. 7

DATA INTERACTION

CROSS-REFERENCE TO RELATED APPLICATION

This application claims the priority to Chinese Patent Application No. 202311639612.0, filed on Dec. 1, 2023, the disclosure of which is incorporated herein by reference in its entirety.

TECHNICAL FIELD

The present disclosure relates to computer technologies, in particular to data interaction.

BACKGROUND

With the rapid development of the Internet and communication technology, there is a risk of data leakage in data sharing and circulation between enterprises. While breaking down data silos and realizing data sharing, it is necessary to ensure data security and privacy protection.

A secure multi-party computation (MPC) is an implementation of a privacy computation. To implement the MPC, it is necessary to deploy MPC nodes respectively on all participants and register the MPC nodes with an operation node to form an alliance network including the operation node and member nodes.

However, as the leader of the alliance network, the operation node usually does not broadcast member information of the alliance network to the member nodes, so that the member nodes are not interoperable and cannot perform data interaction with each other. Each member node can perform data interaction with the operation node only, which imposes significant restriction on the member node. This cannot meet data interaction needs of the member nodes and cannot guarantee the security of interaction.

SUMMARY

According to one or more embodiments of the present disclosure, a data interaction method is applied to a first member node of a first alliance network including an operation node and multiple member nodes, the multiple member nodes including the first member node and a second member node. The data interaction method includes: encrypting first interaction data between the first member node and the second member node based on a public key of the second member node to obtain first encrypted data; signing first data based on a private key of the first member node to obtain first signed data, the first data comprising the first interaction data and/or the first encrypted data; generating a first access token for a first node based on the first encrypted data and a first initial access token for the first node; generating a first request message for data interaction between the first member node and the second member node based on the first encrypted data, the first signed data and the first access token; and sending the first request message to the first node.

According to one or more embodiments of the present disclosure, a data interaction method is applied to an operation node of a first alliance network, the first alliance network including the operation node and multiple member nodes, the multiple member nodes including a first member node and a second member node. The data interaction method includes: upon receiving a first request message for the second member node from the first member node, obtaining a second authentication result for the first request message based on a first access token in the first request message, wherein the first request message further comprises first encrypted data, second signed data and third signed data, the first encrypted data being obtained by the first member node encrypting first interaction data between the first member node and the second member node based on a public key of the second member node, the second signed data being obtained by the first member node signing the first interaction data based on a private key of the first member node, the third signed data being obtained by the first member node signing the first encrypted data based on the private key of the first member node; in response to determining that the second authentication result indicates that the first request message is authenticated, performing signature verification on the third signed data based on a public key of the first member node to obtain a second verification result; in response to determining that the second verification result indicates that the first encrypted data is not tampered with and the first member node has an interaction authority with respect to the second member node, generating a third access token for the second member node based on the first encrypted data and a first initial access token for the second member node; generating a third request message based on the first encrypted data, the second signed data and the third access token; and sending the third request message to the second member node, to enable the second member node to perform data interaction with the first member node based on the third request message.

According to one or more embodiments of the present disclosure, an electronic device includes: at least one processor; and a memory storing one or more computer programs executable by the at least one processor to perform the data interaction method described above.

BRIEF DESCRIPTION OF THE DRAWINGS

FIG. 1 is a flowchart of a data interaction method according to one or more embodiments of the present disclosure.

FIG. 3 is a flowchart of a data interaction method according to one or more embodiments of the present disclosure.

FIG. 7 is a flowchart of a data interaction method according to one or more embodiments of the present disclosure.

DETAILED DESCRIPTION

Figure 2:
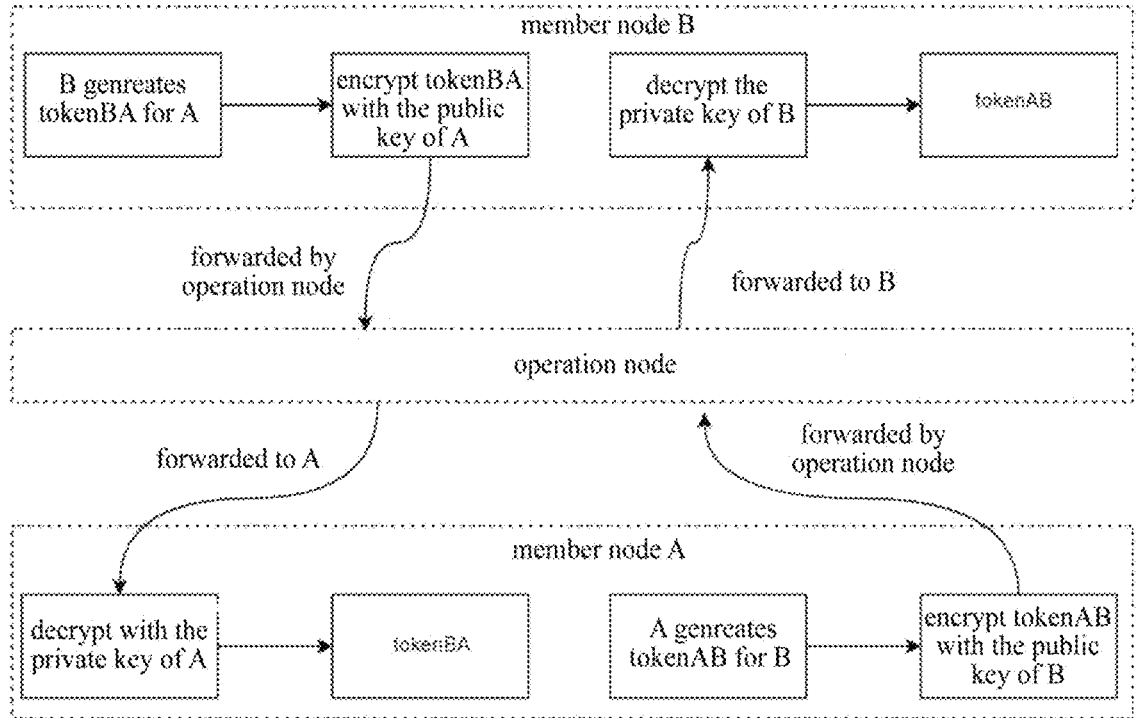
FIG. 2 schematically shows an access token negotiation process according to one or more embodiments of the present disclosure.

Some embodiments of the present disclosure will be described in detail below with reference to the accompanying drawings. The embodiments are described for illustrative purposes only and are not intended to limit the present disclosure.

Embodiments of the present disclosure and features in embodiments may be combined with each other without conflict.

As used herein, the term "and/or" includes any and all combinations of one or more related enumerated entries.

The terms used herein are used only to describe one or more particular embodiments and are not intended to limit the present disclosure. As used herein, the singular forms "a" and "the" are also intended to include the plural, unless the context clearly indicates otherwise. It will also be understood that when the terms "including" and/or "made of" are used in the present disclosure, the presence of the feature, whole, step, operation, element and/or component is specified, but the presence or addition of one or more other features, whole, step, operation, element, component and/or group thereof is not excluded. Words such as "connected" are not limited to physical or mechanical connections, but may include electrical connections, whether direct or indirect.

Unless otherwise specified, all terms used herein (including technical and scientific terms) have the same meanings as those normally understood by those of ordinary skill in the art. It will also be understood that terms such as those defined in common dictionaries are to be interpreted as having meanings consistent with their meanings in the context of related technology and the present disclosure, and will not be interpreted as having idealized or overly formal meanings, unless expressly defined herein.

The multiple participants of multi-party secure computation MPC usually include the operator and the members. The operator is responsible for the management of the member and is usually the creator of the alliance network. When implementing MPC, it is necessary to deploy the MPC system on the electronic device of each of the participants to form an operation node corresponding to the operator and member nodes respectively corresponding to the members. The member nodes register with the operation node to form the alliance network. The operation node and all of the member nodes in the alliance network are interoperable, and can perform data interaction to perform cooperative computation tasks or other types of tasks, while the member nodes usually are not interoperable.

In related technologies, data interaction between the member nodes may be realized by setting a relay node. But corresponding solutions cannot be provided for anti-leakage, anti-tampering, malicious requests, and illegal requests of transmitted data, and the security of data transmission is poor.

In related technologies, it is possible to set all or part of the functions and authorities of the operation node for the member nodes in order to realize data interaction between the member nodes. However, the operator (operation node) is usually the creator of the alliance network and contributes a lot to the alliance network. In this way, the operation node is directly indistinguishable from an ordinary member node, and the operation node may be "isolated". Moreover, it cannot flexibly control the intercommunication between some member nodes based on the contribution degree of the member nodes to the alliance network.

According to the data interaction method according to one or more embodiments of the present disclosure, the operation node may select some of the member nodes in the alliance network to construct a sub-network (also referred to as a virtual alliance or a first alliance network), and the visibility and intercommunication between the member nodes of the virtual alliance is implemented through forwarding or direct sending, so as to meet the requirements of cooperative computation tasks between the member nodes.

As for the data interaction method according to one or more embodiments of the present disclosure, for the interaction data between the member nodes, the efficiency of encryption and decryption and the security can be improved through an asymmetric encryption method, the risk of data tampering can be reduced by performing signing and signature verification on the interaction data, and the malicious request and illegal request can be reduced through access authentication, so that the security of the network interaction data can be greatly improved while meeting the requirements of the cooperative computation task between the member nodes.

The data interaction method according to one or more embodiments of the present disclosure can be applied to a first member node of the first alliance network. The first alliance network includes an operation node and multiple member nodes, and the first member node is one of the multiple member nodes. The operation node is the node corresponding to the operator, and the member nodes are the nodes respectively corresponding to the members (such as the provider) of the first alliance network. Each of the operation node and the member nodes may correspond to an electronic device such as a terminal device or a server. The data interaction method according to one or more embodiments of the present disclosure is applied to the first member node, that is, the method may be executed by an electronic device corresponding to the first member node.

The terminal device may be a vehicle device, a User Equipment (UE), a mobile device, a user terminal, a terminal, a cellular phone, a cordless phone, a Personal Digital Assistant (PDA), a handheld device, a computation device, a vehicle device, a wearable device, etc. The server may be a local/cloud server or a server cluster, etc., which is not limited herein.

FIG. 1 is a flowchart of a data interaction method according to one or more embodiments of the present disclosure. Referring to FIG. 1, the method includes steps S11 to S15.

At step S11, the first interaction data between the first member node and the second member node is encrypted based on the public key of the second member node among the plurality of member nodes to obtain the first encrypted data.

At step S12, the first data is signed based on the private key of the first member node to obtain the first signed data, the first data including the first interaction data and/or the first encrypted data.

At step S13, the first access token for the first node is generated based on the first encrypted data and the initial access token for the first node, the first node including the operation node or the second member node.

At step S14, the first request message is generated based on the first encrypted data, the first signed data and the first access token, and the first request message is used for data interaction between the first member node and the second member node.

At step S15, the first request message is sent to the first node.

For example, before executing steps S11 to S15, an initial alliance network (hereinafter referred to as a second alliance network) may be created by the operator node, and the second alliance network includes the operator node and multiple initial member nodes.

In the stage of creating the second alliance network, the operation node sends an MPC installation package to the multiple initial member nodes. Each of the initial member nodes completes the installation and deployment of the MPC system based on the MPC installation package provided by the operation node. Each of the initial member nodes generates its own public key and private key, and sends the public key to the operation node; each of the initial member nodes registers its own node information (such as a communication address, etc.) with the operation node. Each of the initial member nodes also generates an access token for the operation node, encrypts the access token with the public key of the operation node to obtain an encrypted access token and sends the encrypted access token to the operation node. The operation node uses its own private key to decrypt the encrypted access token to obtain the access token. In this way, in the created second alliance network, the operation node and all of the initial member nodes in the second alliance network are interoperable, while the initial member nodes in the second alliance network are not interoperable and cannot perform cooperative computation tasks.

In one or more embodiments of the present disclosure, the operation node may select some or all of the initial member nodes to construct a virtual alliance (hereinafter referred to as the first alliance network), the first alliance network including the operation node and multiple member nodes (i.e., selected initial member nodes). The connection mode between the multiple member nodes of the first alliance network may select a star mode or a direct connection mode. In the star mode, the network interaction request between the member nodes need to be forwarded by the operation node. In the direct connection mode, the network interaction request between the member nodes is sent directly to a peer target member node. If the network between member nodes is not connected or the network policy is not opened, the first alliance network in star mode may be created to realize the intercommunication between nodes; If the network between member nodes has been connected, the first alliance network in star mode or direct connection mode may be created to realize the intercommunication between nodes. In this way, the flexibility of intercommunication between member nodes can be improved.

In the stage of constructing the first alliance network, the operation node may broadcast the information of the multiple member nodes in the first alliance network to all of the member nodes in the first alliance network to synchronize the information of the multiple member nodes. In different connection modes, the synchronized information of the member nodes is different. In the direct connection mode, the communication address in the synchronized information of the member nodes is the real communication address of other member nodes. In the star mode, the communication address in the synchronized information of the member nodes is the communication address of the operation node which plays a role of agent.

In the initialization stage of the member nodes in the first alliance network, the operation node may synchronize the public key of any one of the member nodes in the first alliance network to other member nodes in the first alliance network. After each of the member nodes receives the public key of other member nodes, it generates an access token for a peer member node (that is, other member nodes except the member node), encrypts the access token with the public key of the peer member node to obtain the encrypted access token, and sends the encrypted access token to the operation node. The operation node forwards the encrypted access token to the peer member node. After receiving the encrypted token, the peer member node decrypts the access tokens with its own private key to obtain the access token.

In this way, each of the member nodes in the first alliance network holds its own private key, the communication addresses of the other member nodes, the public key for data encryption and the access token for authentication. The interconnection and intercommunication can be implemented, and the cooperative computation task between the member nodes can be performed.

In one or more embodiments of the present disclosure, in the stage of performing the cooperative computation task between the member nodes in the first alliance network, data interaction is required between two of the member nodes. When the first member node needs to send the first interaction data to a second member node among the multiple member nodes, in step S11, the first interaction data may be encrypted based on the public key of the second member node to obtain the first encrypted data. The encryption method may adopt asymmetric encryption, such as SM2 elliptic curve cryptography algorithm. The specific encryption method is not limited herein.

By adopting the asymmetric encryption method, the efficiency of encryption and decryption can be improved and the security can be improved. Moreover, the encryption using the public key of the second member node requires the private key of the second member node to be decrypted. The operation node cannot decrypt without the private key of the second member node, thereby improving the effect of data leakage prevention.

In one or more embodiments of the present disclosure, in step S12, the first data is signed based on the private key of the first member node to obtain the first signed data. The first data includes the first interaction data and/or the first encrypted data. In this way, interaction data can be prevented from being tampered with during transmission.

In the direct connection mode, the request message for data interaction is directly sent to the second member node. In this case, the first interaction data is directly signed based on the private key of the first member node to obtain the signed data (hereinafter referred to as the second signed data). In the star mode, the request message will be sent to the operation node, and will be forwarded to the second member node by the operation node. In this case, the first encrypted data may be additionally signed based on the private key of the first member node to obtain the signed data (hereinafter referred to as the third signed data).

In this way, in the direct connection mode, the first data includes the first interaction data, and the first signed data includes the second signed data. In the star mode, the first data includes the first interaction data and first encrypted data, and the first signed data includes the second signed data and the third signed data.

In one or more embodiments of the present disclosure, in the star mode, only the first encrypted data may be signed, that is, the first data includes only the first encrypted data, and the obtained first signed data includes only the third signed data, which is not limited herein.

In one or more embodiments of the present disclosure, in step S13, the first access token for the first node may be generated based on the first encrypted data and the initial access token for the first node. The first node includes the operation node or the second member node. In this way, authentication of access authority can be realized.

In the direct connection mode, the request message is directly sent to the second member node, and the first node is the second member node. In this case, the first access token for the second member node may be generated based on the first encrypted data, the initial access token for the second member node, time stamp and the like through a preset digest algorithm. The digest algorithm is, for example, the digest algorithm of the SM3 cryptographic hash function standard, and the specific type of the digest algorithm is not limited herein.

In the star mode, the request message will be sent to the operation node, and will be forwarded to the second member node by the operation node. The first node is the operation node. In this case, the first access token for the operation node may be generated based on the first encrypted data, the initial access token for the operation node, the time stamp and the like through a preset digest algorithm.

In one or more embodiments of the present disclosure, after encrypting, signing, and generating the access token, in step S14, the first request message for data interaction with the second member node may be generated based on the first encrypted data, the first signed data, and the first access tokens.

Further, in step S15, the first request message may be sent to the first node. In the direct connection mode, the first node is the second member node. The first request message may be directly sent to the second member node to complete the sending process of a data interaction. In the star mode, the first node is the operation node. The first request message may be sent to the operation node, verified and forwarded to the second member node by the operation node to complete the sending process of a data interaction.

According to one or more embodiments of the present disclosure, when the first member node performs data interaction with the second member node, the interaction data may be encrypted with the public key of the second member node to improve the security of the data, the first member node may be signed with the private key to improve the anti-tampering effect of the interaction data, and the authentication of the access authority can be realized by generating the access token to reduce the malicious request and illegal request. So that the security of the network interaction data can be greatly improved while meeting the requirements of the cooperative computation task between the member nodes.

The data interaction method according to one or more embodiments of the present disclosure will be described below.

As described above, firstly, the second alliance network is created under the leadership of the operation node. The second alliance network includes the operation node and the multiple initial member nodes.

In the stage of creating the second alliance network, the operator installs and deploys the MPC system to form the operation node OP, and generates the public and private key pair of the operation node OP, including the public key and the private key. The operation node OP sends the MPC installation package (including the public key of the operation node OP, the initial access token for each of the initial member nodes, etc.) to the multiple member parties, such as member A, member B, member C and member D; The members completes the installation and deployment of the MPC system to form the initial member nodes, such as initial member node A, initial member node B, initial member node C and initial member node D. In this way, each of the initial member nodes holds the public key of the operation node OP and initial access token.

In one or more embodiments of the present disclosure, when each of the initial member nodes generates a public and private key pair, the public and private key pair includes a public key and a private key. Each of the initial member nodes synchronizes its own public key offline to the operation node OP of the operator. Each of the initial member nodes registers its own node information (e.g. communication address, etc.) with the operation node. Moreover, each of the initial member nodes generates an initial access token for the operation node, encrypts the initial access token with the public key of the operation node to obtain an encrypted initial access token and sends the encrypted initial access token to the operation node. The operation node uses its own private key to decrypt encrypted initial access token to obtain the initial access token. In this way, the operation node OP holds the public key, node information, and initial access token for each of the initial member nodes.

When the network policy between the operation node and the initial member nodes is opened, the operation node OP and all of the initial member nodes (such as the initial member nodes A, B, C and D) are interoperable and all may perform a cooperative computation task. The initial member nodes are not interoperable, and cannot perform the cooperative computation task.

In order to satisfy the intercommunication between all or part of the initial member nodes, the operation node may construct the first alliance network.

In one or more embodiments of the present disclosure, the multiple member nodes in the first alliance network are part of the initial member nodes in the second alliance network. The multiple member nodes of the first alliance network are interoperable and part of the initial member nodes of the second alliance network other than the multiple member nodes are not interoperable.

That is to say, the first alliance network includes the operation node and multiple member nodes, and the member nodes are part of the initial member nodes selected from the second alliance network by the operation node. The specific selection conditions of the member nodes of the first alliance network is not limited herein. After the first alliance network is built, the member nodes of the first alliance network are interoperable, and part of the initial member nodes in the second alliance network other than the member nodes still are not interoperable.

In one or more embodiments of the present disclosure, the connection mode between the multiple member nodes of the first alliance network may be a star mode or a direct connection mode. In the star mode, the network interaction request between the member nodes requires to be forwarded by the operation node. In the direct connection mode, the network interaction request between member nodes is directly sent to a peer target member node.

In one or more embodiments of the present disclosure, at the stage of constructing the first alliance network, at the operation node side, the data interaction method according to one or more embodiments of the present disclosure includes steps S21, S24 and S28.

At step S21, the operation node sends the first member broadcast message to the multiple member nodes to construct the first alliance network. The first member broadcast message includes the node information of each of the member nodes of the first alliance network. The multiple member nodes are part of the initial member nodes in the second alliance network.

At step S24, upon receiving a public key obtaining request from the first member node, the operation node sends the public key of each of one or more third member nodes to the first member node, each of the third member nodes being a member node other than the first member node among the multiple member nodes of the first alliance network.

At step S28, upon receiving the second encrypted data from the first member node, the operation node forwards the second encrypted data to a corresponding one of the third member nodes, the second encrypted data being obtained by the first member node using the public key of each of the third member nodes to encrypt the initial access token for each of the third member nodes accessing the first member node;

The multiple member nodes of the first alliance network are interoperable.

In one or more embodiments of the present disclosure, at the stage of constructing the first alliance network, at the first member node side, the data interaction method according to one or more embodiments of the present disclosure further comprises steps S22, S23, S25, S26 and S27.

At step S22, the first member node determines the node information of each of the third member nodes based on the first member broadcast message for the multiple member nodes from the operation node, each of the third member nodes being a member node other than the first member node among the multiple member nodes of the first alliance network.

At step S23, the first member node sends a public key obtaining request to the operation node, the public key obtaining request being used for obtaining the public key of each of the third member nodes.

At step S25, upon receiving the public key of each of the third member nodes sent by the operation node, the first member node stores the public key of each of the third member nodes.

At step S26, the first member node generates an initial access token for each of the third member nodes to access the first member node, and encrypts the initial access token with the public key of each of the third member nodes to obtain the second encrypted data.

At step S27, the first member node sends the second encrypted data to the operation node so that the operation node forwards the second encrypted data to each of the third member nodes.

For example, the second alliance network includes the initial member nodes A, B, C and D, and the operation node selects A, B and C as member nodes to construct the first alliance network. In this case, the node information of each of the member nodes included in the first alliance network is shown in Table 1.

TABLE 1

| Node identifier | Node Name | Node communication address |
|---|---|---|
| 10000 | OP | https://server.op.com |
| 10001 | A | https://server.a.com |
| 10002 | B | https://server.b.com |
| 10003 | C | https://server.c.com |

In Table 1, the node information of each of the member nodes includes node identifier, node name and node communication address. The node information may also include other contents, which is not limited herein.

In step S21, the operation node sends the first member broadcast message to the multiple member nodes. The first member broadcast message includes node information of each of the multiple member nodes, including node identifier, node name, node communication address, and the like. In different connection modes, the synchronized node information of the first member broadcast message is different. In the direct connection mode, the communication address in the synchronized node information is the real communication address of another member node. In the star mode, the communication address in the synchronized node information is the communication address of the operation node.

In step S22, upon receiving the first member broadcast message, the first member node determines the node information of each of the third member nodes based on the first member broadcast message. Each of the third member nodes is a member node other than the first member node among the multiple member nodes of the first alliance network. For example, the first member node is node A, then the third member nodes are B and C. Node A may determine the node information of nodes B and C upon receiving the first member broadcast message.

In one or more embodiments of the present disclosure, in the direct connection mode, the node information of each of the nodes B and C is the real communication address. In this way, the node information of Table 2, which includes the node information of the operation node OP, can be obtained.

TABLE 2

| Node identifier | Node Name | Node communication address |
|---|---|---|
| 10000 | OP | https://server.op.com |
| 10002 | B | https://server.b.com |
| 10003 | C | https://server.c.com |

In one or more embodiments of the present disclosure, in the star mode, the node information of each of nodes B and C is the communication address of the operation node. In this way, the node information of Table 3, which includes the node information of the operation node OP, can be obtained.

TABLE 3

| Node identifier | Node Name | Node communication address |
|---|---|---|
| 10000 | OP | https://server.op.com |
| 10002 | B | https://server.op.com |
| 10003 | C | https://server.op.com |

Similarly, the node B obtains the node information of each of the nodes A and C, and the node C obtains the node information of each of the nodes A and B. In different connection modes, the content of the node information is similar to that of Table 2 and Table 3, which is not repeated herein.

In one or more embodiments of the present disclosure, after each of the member nodes of the first alliance network obtains the node information of other member nodes, in order to realize normal communication between the member nodes, it also requires the public key of the other party for encrypting data transmitted, and the access token issued by the other party for authenticating the access authority of the other party.

In step S23, the first member node sends a public key obtaining request to the operation node. The public key obtaining request is used for obtaining the public key of each of the third member nodes. For example, if the first member node is the node A, the node A sends the public key obtaining request to the operation node to obtain the public key of each of the nodes B and C.

In step S24, upon receiving the public key obtaining request from the first member node, the operation node sends the public key of each of the third member nodes to the first member node. For example, the operation node sends the public key of each of the nodes B and C to node A, which is similar for the public keys of the nodes B and C.

In step S25, upon receiving the public key of each of the third member nodes sent by the operation node, the first member node stores the public key of each of the third member nodes. For example, the node A receives and stores the public keys of each of the nodes B and C, which is similar for the nodes B and C.

In step S26, the first member node may generate the initial access token for each of the third member nodes to access the first member node, and encrypt the initial access token with the public key of each of the third member nodes to obtain the second encrypted data.

In step S27, the second encrypted data is sent to the operation node so that the operation node forwards the second encrypted data to each of the third member nodes. For example, the node A generates initial access tokens tokenAB and tokenAC respectively for the nodes B and C to access the node A, encrypts the initial access tokens tokenAB and tokenAC respectively based on the public keys of the nodes B and C, and obtains encrypted tokenAB and encrypted tokenAC, that is, the second encrypted data, and send the second encrypted data to the operation node, respectively.

In step S28, upon receiving the second encrypted data from the first member node, the operation node forwards the second encrypted data to a corresponding one of third member nodes. For example, the second encrypted data for the node B to access the node A is sent to the node B, and the second encrypted data for node C to access the node A is sent to the node C.

In one or more embodiments of the present disclosure, at the stage of constructing the first alliance network, at the first member node side, the data interaction method according to one or more embodiments of the present disclosure further comprises:

upon receiving the third encrypted data of each of the third member nodes sent by the operation node, decrypting the third encrypted data by using the private key of the first member node to obtain the initial access token for the first member node to access each of the third member nodes, and storing the initial access token for the first member node to access each of the third member nodes.

The third encrypted data is obtained by each of the third member nodes using the public key of the first member node to encrypt the initial access token.

That is, the first member node A also receives the third encrypted data of each of the third member nodes (e.g. the nodes B and C) forwarded by the operation node. The third encrypted data is obtained by each of the third member nodes (e.g. the nodes B and C) encrypting the initial access tokens by using the public key of the first member node A. The first member node A may use its own private key to decrypt the third encrypted data to obtain the initial access token for each of the third member nodes.

FIG. 2 schematically shows an access token negotiation process between the operation node, the member node A, and the member node B during constructing the first alliance network according to one or more embodiments of the present disclosure.

Referring to FIG. 2, the member node B generates an initial access token tokenBA for the member node A, encrypts the initial access token tokenBA with the public key of member node A to obtain encrypted data, and sends the encrypted data to the operation node. The operation node forwards the encrypted data to the member node A. Upon receiving the encrypted data, the member node A uses the private key of the member node A to decrypt the encrypted data to obtain the initial access token tokenBA. Similarly, the member node A generates an initial access token tokenAB for the member node B, encrypts the initial access token tokenAB with the public key of the member node B to obtain encrypted data, and sends the encrypted data to the operation node. The operation node forwards the encrypted data to the member node B. Upon receiving the encrypted data, the member node B uses the private key of the member node B to decrypt the encrypted data to obtain the initial access token tokenAB. Thus, the access token negotiation process between the nodes A and B is completed. The access token negotiation process between the nodes A and C is similar, which is not repeated herein.

After processing, each of the member nodes in the first alliance network holds its own private key, the communication addresses of other member nodes, the public key for data encryption and the initial access token for authentication, so that intercommunication may be implemented and cooperative computation tasks between the member nodes are performed. Since the operation node does not have the private keys of each of the member nodes, it is not possible to obtain each initial access token and forge requests during the subsequent data interaction process, thereby further improving security.

In this way, the construction of the first alliance network and the initialization stage of the member nodes in the first alliance network can be implemented, the intercommunication between member nodes can be implemented, and the security during the subsequent data interaction process can be improved.

In the stage of executing cooperative computation tasks between the member nodes in the first alliance network, data interaction is required between two of the member nodes. For example, when the first member node A initiates a cooperative computation task to the second member node B, it may obtain the communication address of the destination through the member identifier of the second member node B, determines whether the request is required to be forwarded by the operation node, and construct different request messages based on different situations.

In one or more embodiments of the present disclosure, in the stage of executing the cooperative computation task, at the first member node side, in step S11, the first member node may encrypt the first interaction data based on the public key of the second member node to obtain the first encrypted data. The encryption method may adopt asymmetric encryption, such as SM2 elliptic curve cryptography algorithm, which has faster encryption and decryption speed and higher security. The specific encryption method is not limited herein.

By adopting the asymmetric encryption method, the efficiency of encryption and decryption can be improved and the security can be improved. Moreover, the encryption using the public key of the second member node requires the private key of the second member node to be decrypted. The operation node cannot decrypt without the private key of the second member node, which can improve the effect of data leakage prevention.

In one or more embodiments of the present disclosure, in step S12, the first member node may sign the first data based on the private key of the first member node to obtain the first signed data. In step S13, the first member node may generate the first access token for the first node based on the first encrypted data and the initial access token for the first node to generate a request message.

In different connection modes, the first node of the request message is different, and the first data is also different.

In one or more embodiments of the present disclosure, in the direct connection mode, the first node is the second member node. In a case where the first node is the second member node, the first data includes first interaction data.

Step S12 includes: signing the first interaction data based on the private key of the first member node to obtain the second signed data, the first signed data including the second signed data.

Step S13 includes: generating the first access token for the second member node based on the first encrypted data and the initial access token for the second member node.

For example, in the direct connection mode, the first member node A stores the node communication address of Table 2, which is the real communication addresses of other member nodes.

In this case, the first interaction data may be directly signed based on the private key of the first member node to obtain the second signed data. The first access token for the second member node may be generated based on the first encrypted data, the initial access token for the second member node, the time stamp and the like through a preset digest algorithm. The digest algorithm is, for example, a digest algorithm of the SM3 cryptographic hash function standard, and the specific type of the digest algorithm is not limited herein.

In this way, the interaction data can be prevented from being tampered with during transmission, and the authentication of access authority can be realized.

In one or more embodiments of the present disclosure, in the star mode, the first node is the operation node. In a case that the first node is the operation node, the first data includes the first interaction data and the first encrypted data, and the operation node is used for forwarding the first request message to the second member node, Step S12 includes: respectively signing the first interaction data and the first encrypted data based on the private key of the first member node to obtain the second signed data and the third signed data, respectively, the first signed data including the second signed data and the third signed data.

Step S13 includes: generating the first access token for the operation node based on the first encrypted data and the initial access token for the operation node.

For example, in the star mode, the first member node A stores the node communication address of Table 3, which is the communication address of the operation node. Since the operation node cannot obtain the first interaction data in plaintext, it is necessary to additionally sign the first encrypted data for signature verification by the operation node. In this case, the first interaction data and the first encrypted data may be respectively signed based on the private key of the first member node to obtain the second signed data and the third signed data, respectively, which together serve as the first signed data. The second signed data is used for signature verification by the second member node, and the third signed data is used for signature verification by the operation node.

In one or more embodiments of the present disclosure, in the star mode, the request message is sent to the operation node and forwarded by the operation node. The first node is the operation node. In this case, the first access token for the operation node may be generated based on the first encrypted data, the initial access token for the operation node, the time stamp and the like through a preset digest algorithm.

In this way, the interaction data can be prevented from being tampered with during transmission, and the authentication of access authority can be realized.

In one or more embodiments of the present disclosure, after encrypting, signing, and generating access token, in step S14, the first member node may generate the first request message based on the first encrypted data, the first signed data and the first access tokens. In step S15, the first request message is sent to the first node.

In the direct connection mode, the first node is the second member node, and the first request message may be directly sent to the second member node to complete the sending process of a data interaction. In the star mode, the first node is the operation node, the first request message may be sent to the operation node, verified and forwarded to the second member node by the operation node to complete the sending process of a data interaction.

In one or more embodiments of the present disclosure, in the direct connection mode, the first request message sent by the first member node A to the second member node B is as follows:

{"header":
    "access_token": "SM3 (encrypt_data+tokenBA+timestamp)",
    "sign": "SM2_WITH_SM3(data, sk_a)"
"body":
    "encrypt_data": "SM2 (data, pk_b)",
    "meta_data": {"timestamp": "time", from ": "A", "to": "B"...}}

In an example of the first request message, "header" represents a request header, "body" represents a request body; and "data" represents the first interaction data;

"encrypt_data" represents the first encrypted data; "SM2 (data, pk_b)" represents the public key pk_b of the node B is used to encrypting the first interaction data "data" to obtain the first encrypted data "encrypt_data".

"sign" represents second signed data; "SM2_WITH_SM3 (data, sk_a)" represents signing the first interaction data "data" with the private key sk_a of the node A itself to obtain the second signed data "sign".

"access_token" represents the first access token for the second member node B; "SM3(encrypt_data+tokenBA+timestamp)" represents generating the first access token "access_token" by using the first encrypted data encrypt_data, the initial access token tokenBA of the node B and timestamp "timestamp" through the SM3 digest algorithm.

"meta_data" represents the metadata of the first request message, including the time "time" of the timestamp "timestamp", the source address and destination address of the message (from": "A", "to": "B") and the like.

In one or more embodiments of the present disclosure, the second member node B may authenticate the access authority based on the first access token "access_token" upon receiving the first request message; in a case that the authentication result is authentication passed, perform signature verification on the second signed data "sign" by using the public key of the message source (that is, "body": "meta_data": from":" X" in the first request message), which is the public key pk_a of the node A; in a case that the verification result is that the data is not tampered with, decrypts the first encrypted data "encrypt_data" based on the private key of the node B itself to obtain the first interaction data "data", so as to execute a corresponding cooperative computation task based on the first interaction data "data".

In this way, a complete interaction process in the direct connection mode is completed.

In one or more embodiments of the present disclosure, in the star mode, the first member node A wants to interact data with the second member node B. The first request message sent to the operation node is as follows:

{"header":
    "access_token": "SM3(encrypt_data+tokenOPA+timestamp)",
    "sign": "SM2_WITH_SM3(encrypt_data, sk_a)",
    "x-forwarded-sign": "SM2_WITH_SM3(data, sk_a)"
"body":
    "encrypt_data": "SM2(data, pk_b)",
    "meta_data": {"timestamp": "time", from: "A", "to": "B"...}}

In an example of the first request message, "header" represents a request header, "body" represents a request body; and "data" represents first interaction data.

"encrypt_data" represents the first encrypted data; "SM2 (data, pk_b)" represents encrypting the first interaction data "data" by using the public key pk_b of the node B to obtain the first encrypted data "encrypt_data".

"x-forwarded-sign" represents the second signed data; "SM2_WITH_SM3(data, sk_a)" represents signing the first interaction data "data" in plaintext using the private key sk_a of the node A itself to obtain the second signed data "x-forwarded-sign", which is used for signature verification by the node B.

"sign" represents third signed data; "SM2_WITH_SM3 (encrypt_data, sk_a)" represents signing the first encrypted data encrypt_data by using the private key sk_a of the node A to obtain the third signed data "sign", which is used for signature verification when forwarding the request message by the operation node.

"access_token" represents the first access token for the operation node OP; "SM3(encrypt_data+tokenOPA+time-stamp)" represents generating the first access token "access_ token" by using the first encrypted data encrypt_data, the initial access token tokenOPA of the operation node OP, and the timestamp "timestamp" through the SM3 digest algorithm.

"meta_data" represents the metadata of the first request message, including the time "time" of the timestamp "time-stamp", the source address and destination address of the message (from ":" A","to": "B"), etc.

FIG. 3 is a flowchart of a data interaction method according to one or more embodiments of the present disclosure. Referring to FIG. 3, in the stage of executing a cooperative computation task, at the operation node side, a data interaction method according to one or more embodiments of the present disclosure includes steps S31 to S35.

At step S31, upon receiving the first request message from the first member node of the first alliance network to the second member node, the operation node determines a second authentication result for the first request message based on the first access token in the first request message. The first member node and the second member node are any two of the multiple member nodes.

The first request message further includes the first encrypted data, the second signed data and the third signed data. The first encrypted data is obtained by the first member node encrypting the first interaction data based on the public key of the second member node. The second signed data is obtained by the first member node signing the first interaction data based on the private key of the first member node. The third signed data is obtained by the first member node signing the first encrypted data based on the private key of the first member node.

At step S32, when the second authentication result is authentication passed, the operation node performs signature verification on the third signed data based on the public key of the first member node to determine the second verification result for the first encrypted data.

At step S33, in a case that the second verification result is that the data is not tampered with, and the first member node has an interaction authority with respect to the second member node, the operation node generates a third access token for the second member node based on the first encrypted data and the initial access token for the second member node.

At step S34, the operation node generates a third request message based on the first encrypted data, the second signed data and the third access token.

At step S35, the operation node sends the third request message to the second member node, so that the second member node can perform data interaction with the first member node based on the third request message.

For example, upon receiving the first request message, in step S31, the operation node OP may perform access authentication based on the first access token "access_token", and determine the second authentication result for the first request message.

In step S32, if the second authentication result is authentication passed, the operation node uses the public key of the message source (that is, "body": "meta_data": "from": "X"), which is the public key pk_a of node A, to performs signature verification on the third signed data "sign" to obtain the second verification result for the first encrypted data; and determines whether the first member node has interaction authority to the second member node based on the message destination (i.e., "body": "meta_data": "to": "B" in the first request message), that is, check whether the member nodes A and B are in the same first alliance network based on Table 1.

At step S33, if the second verification result is that the data is not tampered with, and the first member node has the interaction authority with respect to the second member node, the operation node generates the third access token for the second member node based on the communication address of the second member node, the first encrypted data, and the initial access token for the second member node. Since it is the operation node OP that accesses the second member node B, when constructing the third access token access_token, the tokenBOP issued by the second member node B to the operation node OP should be used.

At step S34, the operation node generates the third request message based on the first encrypted data, the second signed data and the third access token. At step S35, the operation node sends the third request message to the second member node. In order to ensure the consistency of the signature verification by the target receiver whether it is requested to send directly or forward, the value of x-forwarded-sign requires to be replaced with "sign" as the second signed data.

In one or more embodiments of the present disclosure, in the star mode, the third request message forwarded by the operation node OP to the second member node B is as follows:

```
{"header":
    "access_token": "SM3 (encrypt_data+tokenBOP+timestamp)",
    "sign": "SM2_WITH_SM3 (data, sk_a)"
  "body":
    "encrypt_data": "SM2 (data, pk_b)",
    "meta_data": {"timestamp": "time", "from":" A", "to": "B"...}}
```

In the example of the third request message, "header" represents a request header, "body" represents a request body; and "data" represents the first interaction data.

"encrypt_data" represents the first encrypted data; "SM2 (data, pk_b)" represents encrypting the first interaction data "data" by using the public key pk_b of the node B to obtain the first encrypted data "encrypt_data".

"sign" represents the second signed data; "SM2_WITH_SM3(data, sk_a)" represents signing the first interaction data "data" by using the private key sk_a of the node A itself to obtain the second signed data "sign"

"access_token" represents the third access token for the operation node OP for the second member node B; "SM3 (encrypt_data+tokenBOP+timestamp)" represents generating the third access token "access_token" by using the first encrypted data encrypt_data, the initial access token tokenBOP sent by the node B to the operation node OP and timestamp "timestamp" through the SM3 digest algorithm.

"meta_data" represents the metadata of the third request message, including the time "time" of the timestamp "timestamp", the source address and destination address of the message (from ":" A","to": "B"), etc.

In one or more embodiments of the present disclosure, upon receiving the third request message, the second member node B may authenticate the access authority based on the third access token "access_token". If the authentication result is authentication passed, the second member node B perform signature verification on the second signed data "sign" by using the public key pk_a of the node A which is the message source. If the verification result is that the data is not tampered with, the second member node B decrypts the first encrypted data "encrypt_data" based on the private key of the node B itself to obtain the first interaction data "data" so as to execute a corresponding cooperative computation task based on the first interaction data "data".

In this way, a complete interaction process in the star mode is completed.

The above describes the interaction process in the stage of executing the cooperative computation task in a case that the first member node is the sender. As for the data interaction method according to one or more embodiments of the present disclosure, the first member node may also serve as a receiver to receive the interaction data (hereinafter referred to as second interaction data) from other member nodes (hereinafter referred to as a fourth member node, such as node C in Table 1).

As show in FIG. 7, the data interaction method according to one or more embodiments of the present disclosure further includes steps S41 to S43.

At step S41, upon receiving the second request message from the second node, the first member node determines the first authentication result for the fourth member node which is going to interact with the first member node based on the second access token in the second request message. The second node includes the operation node or the fourth member node among the multiple member nodes, The second request message further includes the fourth encrypted data and the fourth signed data. The fourth encrypted data is obtained by the fourth member node encrypting the second interaction data based on the public key of the first member node. The fourth signed data is obtained by the fourth member node signing the second interaction data based on the private key of the fourth member node.

At step S42, in a case that the first authentication result is authentication passed, the first member node performs signature verification on the fourth signed data based on the public key of the fourth member node to determine the first verification result for the second interaction data.

At step S43, in a case that the first verification result is that the data is not tampered with, the first member node decrypts the fourth encrypted data based on the private key of the first member node to obtain the second interaction data.

For example, in the direct connection mode, the second node is the fourth member node to interact with the first member node. In the star mode, the second node is the operation node, and the operation node forwards the request of the fourth member node.

In one or more embodiments of the present disclosure, the second request message includes the second access token, the fourth encrypted data and the fourth signed data. The fourth encrypted data is obtained by the fourth member node encrypting the second interaction data based on the public key of the first member node. The fourth signed data is obtained by the fourth member node signing the second interaction data based on the private key of the fourth member node. The processes of encryption and signing are similar to the previous description, which is not repeated herein.

In one or more embodiments of the present disclosure, the second access token is generated by the second node. In a case that the second node is an operation node, the second access token is determined by the operation node based on the fourth encrypted data and the initial access token for the operation node for the first member node. In a case that the second node is the fourth member node, the second access token is determined by the fourth member node based on the fourth encrypted data and the initial access token for the fourth member node for the first member node. The process of generating the access token is similar to the previous description, which is not repeated herein.

At step S41, upon receiving the second request message, the first member node may authenticate the access authority based on the second access token in the second request message to obtain the first authentication result. At step S42, if the first authentication result is authentication passed, the first member node performs signature verification on the fourth signed data based on the public key of the fourth member node, and determines the first verification result for the second interaction data. At step S43, if the first verification result is that the data is not tampered with, the first member node decrypts the fourth encrypted data based on the private key of the first member node to obtain the second interaction data so as to execute the corresponding cooperative computation task based on the second interaction data.

In this way, the security during the process of data interaction can be improved.

In one or more embodiments of the present disclosure, at the stage of executing the cooperative computation task, at the first member node side, the data interaction method according to one or more embodiments of the present disclosure further includes: determining a processing result of the cooperative computation task between the first member node and the fourth member node based on the second interaction data and the reference data of the first member node.

That is to say, when executing the corresponding cooperative computation task, the first member node may perform corresponding cooperative computation based on the second interaction data and its own reference data to be processed, for example, based on the commodity data of both parties, cooperatively calculates the rate of return of the advertisement etc. The specific types of interaction data and reference data, as well as specific task type of the cooperative computation task are not limited herein.

In this way, the processing process of the cooperative computation task between member nodes can be realized, and the intercommunication and cooperative computation between the member nodes of the first alliance network can be realized.

As for the data interaction method according to one or more embodiments of the present disclosure, the operation node can select the member nodes in the initial alliance network to construct a virtual first alliance network, and the visibility and intercommunication between the member nodes is more flexibly controlled through forwarding or direct sending, thereby satisfying the requirement of the cooperative computation task between the member nodes. In addition, the first alliance network of star mode can be constructed between the member nodes when the network policy is not opened, so that the intercommunication between the member nodes is implemented as the indirect intercommunication between the member nodes through forwarding by the operational node.

As for the data interaction method according to one or more embodiments of the present disclosure, as for the interaction data between the member nodes, the encryption and decryption efficiency can be improved and the security can be improved through an asymmetric encryption method. As for forwarded or direct requests, the risk of data tampering is reduced by performing signing and signature verification on the interaction data, and malicious requests and illegal requests are reduced by means of access authentication, thereby greatly improving the security of network interaction data while meeting the requirement of cooperative computation task between the member nodes.

It can be understood that each of the above-mentioned method embodiments mentioned in the present disclosure may be combined with each other to form a combined embodiment without violating the logic of the principle, which is not repeated herein due to space limitations. A person skilled in the art will appreciate that in the above-described method of a particular embodiment, the specific execution order of each step should be determined by its function and possible internal logic.

In addition, according to one or more embodiments of the present disclosure, a data interaction apparatus, an electronic device and a computer-readable storage medium are also provided, all of which may be used to realize any of the data interaction methods according to one or more embodiments of the present disclosure, and the corresponding technical solutions and descriptions may refer to corresponding description in the method section, which is not repeated.

Figure 4:
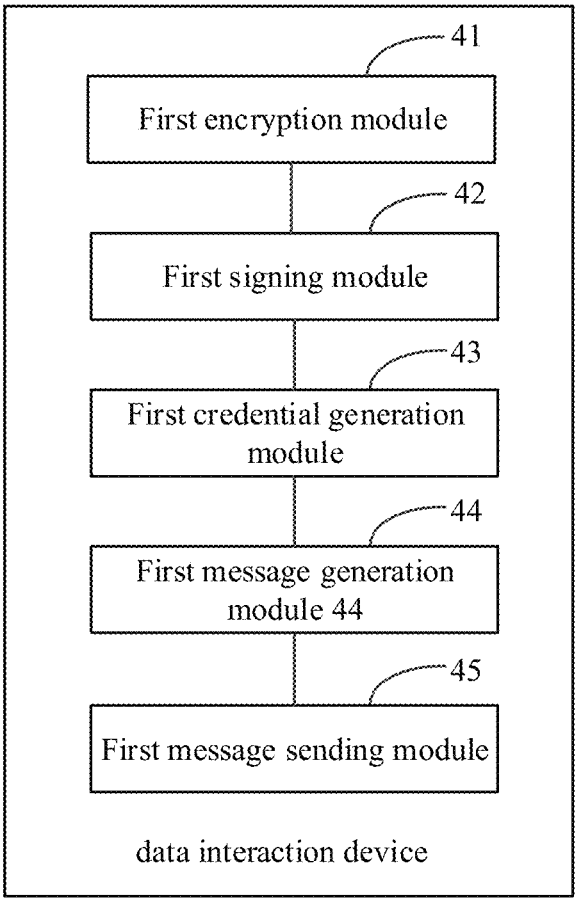
FIG. 4 is a block diagram of a data interaction apparatus according to one or more embodiments of the present disclosure.

FIG. 4 is a block diagram of a data interaction apparatus according to one or more embodiments of the present disclosure.

Referring to FIG. 4, according to one or more embodiments of the present disclosure, a data interaction apparatus is applied to the first member node of the first alliance network. The first alliance network includes the operation node and multiple member nodes. The first member node is one of the multiple member nodes. The device includes a first encryption module 41, a first signing module 42, a first token generation module 43, a first message generation module 44 and a first message sending module 45.

The first encryption module 41 is configured to encrypt the first interaction data between the first member node and the second member node based on the public key of the second member node among the multiple member nodes to obtain the first encrypted data.

The first signing module 42 is configured to sign the first data based on the private key of the first member node to obtain the first signed data. The first data includes the first interaction data and/or the first encrypted data.

The first token generation module 43 is configured to generate the first access token for the first node based on the first encrypted data and the initial access token for the first node. The first node includes the operation node or the second member node.

The first message generation module 44 is configured to generate the first request message based on the first encrypted data, the first signed data and the first access token. The first request message is used for data interaction between the first member node and the second member node.

The first message sending module 45 is configured to send the first request message to the first node.

In one or more embodiments of the present disclosure, the first data includes the first interaction data and the first encrypted data in the case that the first node is the operation node. The operation node is configured to forward the first request message to the second member node. The first data includes the first interaction data in the case that the first node is the second member node.

In one or more embodiments of the present disclosure, the device further includes a second authentication module, a second signature verification module and a first decryption module.

The second authentication module is configured to upon receiving a second request message from the second node, determine the first authentication result for the fourth member node to interact with the first member node based on the second access token in the second request message. The second node includes the operation node or the fourth member node among the multiple member nodes. The second request message further includes the fourth encrypted data and the fourth signed data. The fourth encrypted data is obtained by the fourth member node encrypting the second interaction data based on the public key of the first member node. The fourth signed data is obtained by the fourth member node signing the second interaction data based on the private key of the fourth member node.

The second signature verification module is configured to in a case that the first authentication result is authentication passed, perform signature verification on the fourth signed data based on the public key of the fourth member node to determine the first verification result for the second interaction data.

The first decryption module is configured in a case that the first verification result is that the data is not tampered with, decrypt the fourth encrypted data based on the private key of the first member node to obtain the second interaction data.

In one or more embodiments of the present disclosure, the apparatus further comprises a node information determining module, a public key obtaining module, a public key storage module, a token encryption module and a sending module.

The node information determining module is configured to determine the node information of each of the third member nodes based on the first member broadcast message for the multiple member nodes from the operation node. The third member nodes are one or more member nodes other than the first member node among the multiple member nodes of the first alliance network.

The public key obtaining module is configured to send the public key obtaining request to the operation node. The public key obtaining request is used for obtaining the public key of the third member node.

The public key storage module is configured to store the public key of the third member node upon receiving the public key of the third member node sent by the operation node.

The token encryption module is configured to generate the initial access token for the third member node to access the first member node, and use the public key of the third member node to encrypt the initial access token to obtain second encrypted data.

The sending module is configured to send the second encrypted data to the operation node so that the operation node forwards the second encrypted data to at least one of the third member nodes.

In one or more embodiments of the present disclosure, the device further includes a second decryption module.

The second decryption module is configured to upon receiving the third encrypted data of the third member node sent by the operation node, use the private key of the first member node to decrypt the third encrypted data to determine the initial access token for the first member node accessing the third member node, and stores the initial access token for the first member node accessing the third member node. The third encrypted data is obtained by the third member node using the public key of the first member node to encrypt the initial access token.

Figure 5:
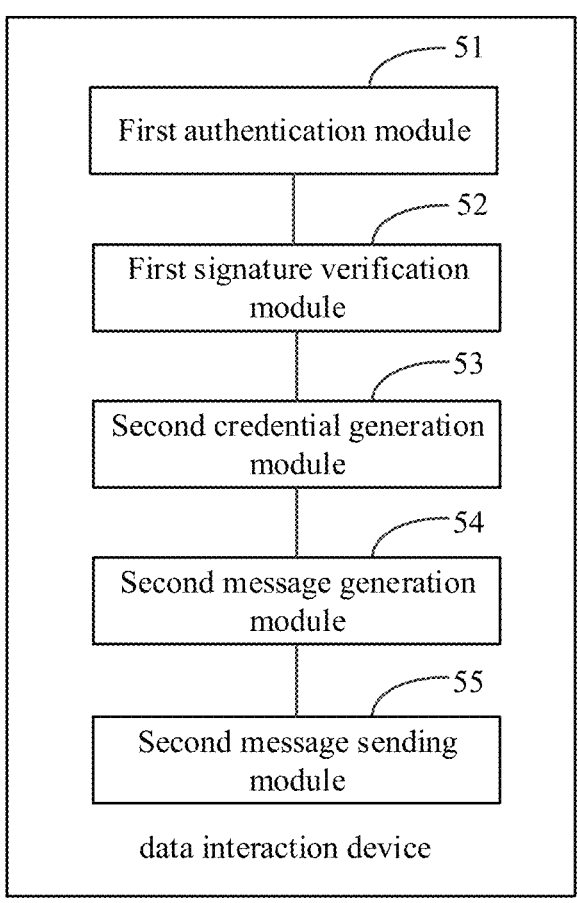
FIG. 5 is a block diagram of a data interaction apparatus according to one or more embodiments of the present disclosure.

FIG. 5 is a block diagram of a data interaction apparatus according to one or more embodiments of the present disclosure.

Referring to FIG. 5, according to one or more embodiments of the present disclosure, a data interaction apparatus is applied to the operation node of the first alliance network. The first alliance network includes the operation node and the multiple member nodes. The device includes a first authentication module 51, a first signature verification module 52, a second token generation module 53, a second message generation module 54 and a second message sending module 55.

The first authentication module 51 is configured to upon receiving the first request message from the first member node of the first alliance network to the second member node, determine the second authentication result for the first request message based on the first access token in the first request message. The first member node and the second member node are any two of the plurality of member nodes. The first request message further includes the first encrypted data, the second signed data and the third signed data. The first encrypted data is obtained by the first member node encrypting the first interaction data based on the public key of the second member node. The second signed data is obtained by the first member node signing the first interaction data based on the private key of the first member node. The third signed data is obtained by the first member node signing the first encrypted data based on the private key of the first member node.

The first signature verification module 52 is configured to in a case that the second authentication result is passed, perform signature verification on the third signed data based on the public key of the first member node to determine the second verification result for the first encrypted data.

The second token generation module 53 is configured to in a case that the second verification result is that the data is not tampered with and the first member node has interaction authority with respect to the second member node, generate the third access token for the second member node based on the first encrypted data and the initial access token for the second member node.

The second message generation module 54 is configured to generate the third request message based on the first encrypted data, the second signed data and the third access token.

The second message sending module 55 is configured to send the third request message to the second member node, so that the second member node performs data interaction with the first member node based on the third request message.

In one or more embodiments of the present disclosure, the second alliance network includes the operation node and multiple initial member nodes. The multiple initial member nodes are not interoperable. The device further includes a broadcast module, public key sending module and a data forwarding module.

The broadcasting module is configured to send the first member broadcast message to the multiple member nodes to construct the first alliance network. The first member broadcast message includes the node information of the multiple member nodes of the first alliance network. The multiple member nodes are part of the initial member nodes in the second alliance network.

The public key sending module is configured to upon receiving the public key obtaining request from the first member node, send the public key of each of the third member nodes to the first member node. The third member nodes are one or more member nodes other than the first member node among the multiple member nodes of the first alliance network.

The data forwarding module is configured to upon receiving the second encrypted data of the first member node, forward the second encrypted data to a corresponding one of the third member nodes. The second encrypted data is obtained by the first member node using the public key of the third member node to encrypt the initial access token for the third member node to access the first member node. The multiple member nodes of the first alliance network are interoperable.

Various modules in the data interaction apparatus may be implemented in whole or in part by software, hardware and combinations thereof. The modules may be embedded in or independent of the processor in the computer equipment in the form of hardware, or stored in the memory in the computer equipment in the form of software, so that the processor calls and executes the operations corresponding to the modules.

Figure 6:
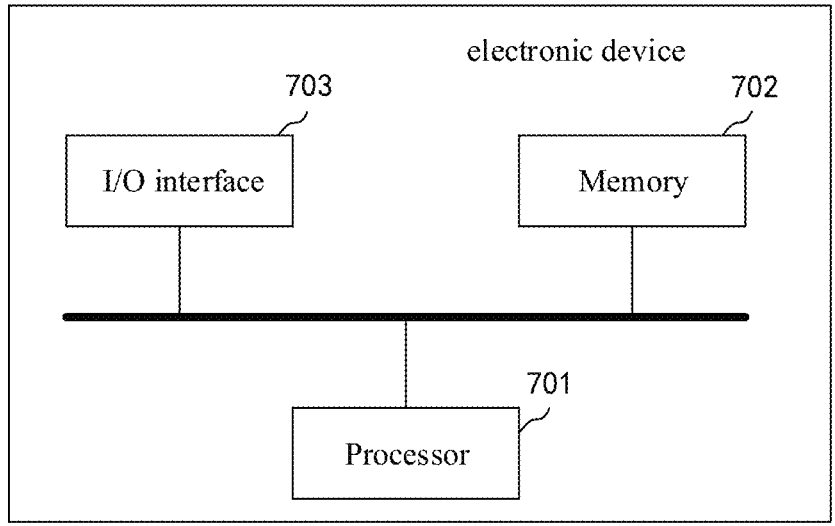
FIG. 6 is a block diagram of an electronic device according to one or more embodiments of the present disclosure.

FIG. 6 is a block diagram of an electronic device according to one or more embodiments of the present disclosure.

Referring to FIG. 6, the electronic device according to one or more embodiments of the present disclosure includes: at least one processor 701; at least one memory 702 and one or more I/O interfaces 703 connected between the processor 701 and the memory 702. The memory 702 is configured to store one or more computer programs executable by the at least one processor 701. The one or more computer programs are executable by the at least one processor 701 to enable the at least one processor 701 to execute the data interaction method described above.

Various modules in the data interaction apparatus may be implemented in whole or in part by software, hardware and combinations thereof. The modules may be embedded in or independent of the processor in the computer equipment in the form of hardware, or stored in the memory in the computer equipment in the form of software, so that the processor calls and executes the operations corresponding to the modules.

According to one or more embodiments of the present disclosure, a computer readable storage medium on which a computer program is stored also provided. The computer program implements the above-mentioned data interaction method when executed by a processor. The computer readable storage medium may be a volatile or non-volatile computer readable storage medium.

According to one or more embodiments of the present disclosure, a computer program product is also provided. The program product includes a computer-readable code, or a non-volatile computer-readable storage medium carrying the computer-readable code. When the computer-readable code is run in the processor of the electronic device, the processor of the electronic device executes the data interaction method.

Those of ordinary skill in the art will appreciate that all or some of the steps, systems, functional modules/units in the device disclosed above may be implemented as software, firmware, hardware, and appropriate combinations thereof. In a hardware embodiment, the partitioning between functional modules/units mentioned in the above description does not necessarily correspond to the partitioning of physical components. For example, a physical component may have multiple functions, or a function or step may be performed cooperatively by several physical components. Some or all physical components may be implemented as software executed by a processor, such as a central processing unit, a digital signal processor or a microprocessor, or as hardware, or as an integrated circuit, such as an application specific integrated circuit. Such software may be distributed over a computer readable storage medium, which may include a computer storage medium (or non-transitory medium) and a communication medium (or transitory medium).

As is well known to those of ordinary skill in the art, the term computer storage medium includes volatile and non-volatile, removable and non-removable medium implemented in any method or technique for storing information (such as computer readable program instructions, data structures, program modules, or other data). Computer storage medium include, but is not limited to, Random Access Memory (RAM), Read-Only Memory (ROM), Erasable Programmable Read-Only Memory (EPROM), Static Random Access Memory (SRAM), flash or other memory technology, Compact Disc Read-Only Memory (CD-ROM), Digital Versatile Disc (DVD) or other optical disc storage, magnetic cartridges, magnetic tapes, magnetic disk storage or other magnetic storage devices, or any other medium that may be used for storing desired information and is accessible by a computer. Further, it is well known to those of ordinary skill in the art that the communication medium typically comprises computer readable program instructions, data structures, program modules, or other data in modulated data signals such as carriers or other transmission mechanisms, and may comprise any information delivery medium.

The computer readable program instructions described herein may be downloaded from a computer readable storage medium to various computation/processing devices, or downloaded to an external computer or external storage device over a network, such as the Internet, a local area network, a wide area network, and/or a wireless network. The network may include copper transmission cable, optic fiber transmission, wireless transmission, router, firewall, switch, gateway computer, and/or edge server. A network adapter card or network interface in each computation/processing device receives computer readable program instructions from the network and forwards the computer readable program instructions for storage in a computer readable storage medium in each computation/processing device.

Computer program instructions for performing operations of the present disclosure may be assembly instructions, instruction set architecture (ISA) instructions, machine instructions, machine-related instructions, microcode, firmware instructions, state setting data, or source or object code written in any combination of one or more programming languages, including object-oriented programming languages such as Smalltalk, C++, etc., and conventional procedural programming languages such as "C" language or the like. Computer readable program instructions may be executed entirely on the user computer, partly on the user computer, as a stand-alone software package, partly on the user computer and partly on a remote computer, or entirely on a remote computer or server. In the case of a remote computer, the remote computer may be connected to a user computer over any kind of network, including a local area network (LAN) or a wide area network (WAN), or may be connected to an external computer (e.g. connected via the Internet by using an Internet service provider). In one or more embodiments of the present disclosure, various aspects of the present disclosure are implemented by personalizing a customized electronic circuit, such as a programmable logic circuit, a field programmable gate array (FPGA), or a programmable logic array (PLA), by using the state information of computer readable program instructions.

The computer program products described herein may be implemented in particular by means of hardware, software, or a combination thereof. In one or more embodiments of the present disclosure, the computer program product is embodied as a computer storage medium. In one or more other embodiments of the present disclosure, the computer program product is embodied as a software product, such as a Software Development Kit (SDK), and the like.

Various aspects of the present disclosure are described herein with reference to flowcharts and/or block diagrams of methods, devices (systems) and computer program products according to one or more embodiments of the present disclosure. It is to be understood that each box of the flowchart and/or block diagram and the combination of the boxes in the flowchart and/or block diagram may be implemented by computer readable program instructions.

These computer readable program instructions may be provided to a processor of a general purpose computer, a dedicated computer, or other programmable data processing device, thereby producing a machine such that the instructions, when executed by the processor of the computer or other programmable data processing device, produce a device for implementing the functions/actions specified in one or more boxes in the flow chart and/or block diagram. The computer-readable program instructions may also be stored in a computer-readable storage medium and cause a computer, programmable data processing device and/or other device to operate in a particular manner, so that the computer-readable medium storing the instructions includes a manufactured article that includes instructions for implementing various aspects of the functions/actions specified in one or more boxes in the flow charts and/or block diagrams.

It is also possible to load computer readable program instructions onto a computer, other programmable data processing device, or other device so that a series of operational steps are performed on the computer, other programmable data processing device, or other device to produce a computer-implemented process. Thus, the instructions executed on the computer, other programmable data processing device, or other device implement the functions/actions specified in one or more boxes in the flowchart and/or block diagram.

The flowcharts and block diagrams in the drawings show the architectures, functions, and operations of possible implementations of systems, methods, and computer program products according to one or more embodiments of the present disclosure. In this regard, each box in the flowchart or block diagram may represent a portion of a module, program segment, or instruction that contains one or more executable instructions for implementing a specified logical function. In one or more alternative embodiments of the present disclosure, the functions labeled in the boxes may also occur in an order different from those shown in the drawings. For example, two consecutive boxes may actually be executed substantially in parallel, and they may sometimes be executed in reverse order, depending on the function involved. It is also noted that each box in the block diagram and/or flow diagram, and a combination of boxes in the block diagram and/or flow diagram, may be implemented with a dedicated hardware-based system that performs a prescribed function or action, or may be implemented with a combination of dedicated hardware and computer instructions.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A data interaction method, applied to a first member node of a first alliance network comprising an operation node and a plurality of member nodes, the plurality of member nodes comprising the first member node and a second member node, wherein the first alliance network is constructed based on a second alliance network comprising the operation node and a plurality of initial member nodes, the plurality of initial member nodes being not interoperable, the plurality of member nodes being part of the initial member node, wherein the plurality of member nodes of the first alliance network are interoperable and performs a cooperative computational task, the data interaction method comprising:

encrypting first interaction data between the first member node and the second member node based on a public key of the second member node to obtain first encrypted data;

signing first data based on a private key of the first member node to obtain first signed data, the first data comprising the first interaction data and/or the first encrypted data;

generating a first access token for a first node based on the first encrypted data and a first initial access token for the first node;

generating a first request message for data interaction between the first member node and the second member node based on the first encrypted data, the first signed data and the first access token; and sending the first request message to the first node;

upon receiving a second request message from the second node that is one of the operation node and a fourth member node, obtaining a first authentication result for the fourth member node based on a second access token in the second request message, wherein the fourth member node is one of the plurality of member nodes other than the first member node, and the second request message further comprises fourth encrypted data and fourth signed data, the fourth encrypted data being obtained by the fourth member node encrypting second interaction data between the fourth member node and the first member node based on a public key of the first member node, the fourth signed data being obtained by the fourth member node signing the second interaction data based on a private key of the fourth member node;

in response to determining that the first authentication result indicates that the fourth member node is authenticated, performing signature verification on the fourth signed data in the second request message based on a public key of the fourth member node to obtain a first verification result; and in response to determining that the first verification result indicates that the second interaction data is not tampered with, decrypting the fourth encrypted data in the second request message based on the private key of the first member node to obtain the second interaction data.

2. The data interaction method according to claim 1, wherein the first node is the operation node;

the first data comprises the first interaction data and the first encrypted data; and the operation node is for forwarding the first request message to the second member node.

3. The data interaction method according to claim 1, wherein the first node is the second member node; and the first data comprises the first interaction data.

4. The data interaction method according to claim 1, further comprising:

obtaining node information of a third member node based on a member message broadcast to the plurality of member nodes by the operation node, the third member node being one of the plurality of member nodes other than the first member node;

sending to the operation node a request for obtaining a public key of the third member node;

upon receiving the public key of the third member node from the operation node, storing the public key of the third member node;

generating a second initial access token for the third member node to access the first member node, and encrypting the second initial access token using the public key of the third member node to obtain second encrypted data; and sending the second encrypted data to the operation node for forwarding the second encrypted data to the third member node.

5. The data interaction method according to claim 4, further comprising:

upon receiving third encrypted data which is from the third member node and forwarded by the operation node, decrypting the third encrypted data using the private key of the first member node to obtain and store a third initial access token for the first member node to access the third member node, wherein the third encrypted data is obtained by the third member node encrypting the third initial access token using a public key of the first member node.

6. A data interaction method, applied to an operation node of a first alliance network, the first alliance network comprising the operation node and a plurality of member nodes, the plurality of member nodes comprising a first member node and a second member node, wherein the first alliance network is constructed based on a second alliance network comprising the operation node and a plurality of initial member nodes, the plurality of initial member nodes being not interoperable, the plurality of member nodes being part of the initial member node, wherein the plurality of member nodes of the first alliance network are interoperable and performs a cooperative computational task, the data interaction method comprising:

upon receiving a first request message for the second member node from the first member node, obtaining a second authentication result for the first request message based on a first access token in the first request message, wherein the first request message further comprises first encrypted data, second signed data and third signed data, the first encrypted data being obtained by the first member node encrypting first interaction data between the first member node and the second member node based on a public key of the second member node, the second signed data being obtained by the first member node signing the first interaction data based on a private key of the first member node, the third signed data being obtained by the first member node signing the first encrypted data based on the private key of the first member node;

in response to determining that the second authentication result indicates that the first request message is authenticated, performing signature verification on the third signed data based on a public key of the first member node to obtain a second verification result;

in response to determining that the second verification result indicates that the first encrypted data is not tampered with and the first member node has an interaction authority with respect to the second member node, generating a third access token for the second member node based on the first encrypted data and a first initial access token for the second member node;

generating a third request message based on the first encrypted data, the second signed data and the third access token; and sending the third request message to the second member node, to enable the second member node to perform data interaction with the first member node based on the third request message.

7. The data interaction method according to claim 6, wherein the first alliance network is constructed based on a second alliance network comprising the operation node and a plurality of initial member nodes, the plurality of initial member nodes being not interoperable, the plurality of member nodes being part of the initial member nodes, the data interaction method further comprising:

broadcasting a member message to the plurality of member nodes to construct the first alliance network, wherein the member message comprises node information of each of the plurality of member nodes;

upon receiving a request for a public key of a third member node from the first member node, sending the public key of the third member node to the first member node, wherein the third member node is one of the plurality of member nodes other than the first member node; and upon receiving second encrypted data from the first member node, forwarding the second encrypted data to the third member node, wherein the second encrypted data is obtained by the first member node encrypting, using the public key of the third member node, a second initial access token for the third member node to access the first member node, wherein the plurality of member nodes are interoperable.

\* \* \* \* \*